US007852782B2

(12) United States Patent
Annic

(10) Patent No.: US 7,852,782 B2
(45) Date of Patent: Dec. 14, 2010

(54) METHOD OF CREATING A SPLIT TERMINAL BETWEEN A BASE TERMINAL AND EQUIPMENTS CONNECTED IN SERIES

(75) Inventor: Etienne Annic, Rambouillet (FR)

(73) Assignee: Orange France, Montrouge (FR)

( * ) Notice: Subject to any disclaimer, the term of this patent is extended or adjusted under 35 U.S.C. 154(b) by 1210 days.

(21) Appl. No.: 11/473,576

(22) Filed: Jun. 22, 2006

(65) Prior Publication Data
US 2007/0008920 A1 Jan. 11, 2007

(30) Foreign Application Priority Data
Jun. 22, 2005 (FR) .................................. 05 06356

(51) Int. Cl.
*G01R 31/08* (2006.01)
(52) U.S. Cl. ........................ 370/252; 370/335; 370/342
(58) Field of Classification Search ......... 370/200–253, 370/272–309, 431–546
See application file for complete search history.

(56) References Cited

U.S. PATENT DOCUMENTS 6,477,159 B1 * 11/2002 Yahagi ....................... 370/335

2002/0172152 A1 * 11/2002 Shiokawa et al. ........... 370/218
2006/0218396 A1 * 9/2006 Laitinen et al. ............. 713/167
2007/0093264 A1 * 4/2007 Srinivasan et al. ........ 455/556.1

FOREIGN PATENT DOCUMENTS

| EP | 1 124 351 A2 | | 1/2001 |
|---|---|---|---|
| EP | 1124351 | * | 1/2001 |
| JP | 63069346 | * | 9/1986 |

OTHER PUBLICATIONS

3GPP, ARIB TR-T12-22.944 V5.1.0, Report on Service Requirements for UE Functionality Split; (Release 5), pp. 1-12, Jun. 2002.

* cited by examiner

*Primary Examiner*—Ricky Ngo
*Assistant Examiner*—Iqbal Zaidi
(74) *Attorney, Agent, or Firm*—Cohen Pontani Lieberman & Pavane LLP

(57) ABSTRACT

System and method for creating a split terminal (T+$\Sigma E_n$) for accessing a service (S). The system comprises a base terminal (T), equipped with a management device ($PA_0$) for executing a split terminal procedure (UES), and a plurality of equipments ($E_n$) connected in series to said base terminal (T), said equipments ($E_n$) respectively being each equipped with at least one management device ($PA_n$) for executing said split terminal procedure (UES). The system can be applied for setting up a secured connection for exchanging data between a base terminal (T) and a number of communicating equipments ($E_n$).

9 Claims, 3 Drawing Sheets

US 7,852,782 B2

METHOD OF CREATING A SPLIT TERMINAL BETWEEN A BASE TERMINAL AND EQUIPMENTS CONNECTED IN SERIES

FIELD OF THE INVENTION

The present invention relates to a method of creating a split terminal for accessing a service, said split terminal being made up of a base terminal and a plurality of equipments connected in series to said base terminal.

The invention finds particularly advantageous application in the field of so-called proximity services, for which access and execution require the creation of a "split terminal" according to the procedure described in the recommendations of the 3GPP (Third Generation Partnership Project) standards organization. The invention applies in particular to the setting up of a secured connection for the exchange of data between a base terminal T and a number of communicating equipments $E_n$.

The invention applies more specifically to the GPRS/UMTS mobile networks, although it is not limited to this single application and can be applied generally to any other type of equipment, such as fixed telephones, television apparatus (TV), personal computers, domestic equipments, industrial equipments, automatic dispensers, etc.

BACKGROUND OF THE INVENTION

European patent application no. 03293342.6 discloses how a so-called "split" terminal can be made up between a base terminal and a communicating equipment to implement a given proximity service. The procedure used to create such a split terminal is called UES (User Equipment Split) procedure. Said split terminal T+E is then made up of a terminal T and an equipment E. This document provides for a given base terminal to be able to be connected independently to a number of different equipments to form as many so-called "split" terminals associated with as many proximity services. In this case, each of the various equipments forms a different split terminal, each time including the base terminal with each of the equipments.

However, this document does not describe how a base terminal can be linked to a number of equipments to produce a single split terminal required for executing a single service.

SUMMARY OF THE INVENTION

One aspect of the invention is directed to a method of creating a split terminal for accessing a service, said split terminal being made up of a base terminal and a plurality of equipments connected in series to said base terminal, the base terminal and said equipments respectively having management devices for executing a split terminal procedure, noteworthy in that said method comprises:
  an initialization step consisting in transmitting to the base terminal, by said service, the parameters for accessing said equipments,
  a plurality of successive iterative steps for creating a split terminal $(T+\Sigma E_{n-1})+E_n$ by connecting the equipment $E_n$ to the split terminal $T+\Sigma E_{n-1}$ created in the preceding step, each step comprising operations consisting in:
    transmitting, by the base terminal to the equipment $E_{n-1}$, the parameters for accessing the equipment $E_n$,
    setting up a communication between the management devices $PA_{n-1}$ and $PA_n$ for executing the split terminal procedure for the equipments $E_{n-1}$ and $E_n$,
    creating the split terminal $T+\Sigma E_{n-1}+E_n$ by executing the split terminal procedure UES between the management devices $PA_0$ and $PA_n$ via the management device $PA_{n-1}$.

Another aspect of the invention is directed to a system for creating a split terminal $T+\Sigma E_n$ for accessing a service S, said system comprising a base terminal T, equipped with a management device $PA_0$ for executing a split terminal procedure UES, and a plurality of equipments $E_n$ connected in series to said base terminal T, said equipments $E_n$ being each respectively equipped with at least one management device $PA_n$ for executing said split terminal procedure UES.

The invention defines the procedure for making up a split terminal comprising a base terminal T and a number of communicating equipments $E_1$ to $E_n$. Said split terminal $T+E_1+E_2+\ldots+E_n$ enables the user of the base terminal to increase the capabilities and the technical characteristics of his base terminal. The user of a terminal may wish to communicate with an equipment that does not belong to him or that is not physically connected to the base terminal. In particular, the terminal may be located near to or not near to various equipments with which the user wishes to communicate. The system allows for the construction of a split terminal, which is constructed progressively with secured communications, one equipment at a time, between a base terminal T and a number of communicating equipments.

According to an embodiment of the invention, said parameters for accessing the equipment $E_n$ comprise an identifier of the equipment $E_{n-1}$ of an interface for accessing said equipment $E_n$ via a proximity network $PN_n$ linking the equipments $E_{n-1}$ and $E_n$.

In the absence of a specification of such an interface identifier among the access parameters supplied by the management device $PA_0$ on the base terminal T, the invention provides for said parameters for accessing the equipment $E_n$ to comprise an address of the equipment $E_n$ in the proximity network $PN_n$ and an identifier of the equipment $E_n$, and for the interface on the equipment $E_{n-1}$ for accessing said equipment $E_n$ in a proximity network $PN_n$ linking the equipments $E_{n-1}$ and $E_n$ to be determined by executing the split terminal procedure UES by the management device $PA_{n-1}$ successively on every interfaces of the equipment $E_{n-1}$ in said proximity network, until the split terminal procedure UES applied to one of said interfaces sends said identifier of the equipment $E_n$.

When the access path is not specified, the device $PA_n$ runs a UES procedure on each interface of the equipment $E_n$, one by one, until it finds the one which, by the UES procedure, sends the identifier of the access interface matching that supplied by the service S.

Finally, according to an advantageous provision of the method according to the invention, after the creation of the split terminal $(T+\Sigma E_{n-1})+E_n$, the management device $PA_{n-1}$ sets up a tunnel $T(n-1)-n$ for permanent communication with the management device $PA_n$, and the management device $PA_0$ sets up a tunnel $T0-n$ for permanent communication with the management device $PA_n$, encapsulated in the tunnels $T0-(n-1)$ and $T(n-1)-n$.

The composition of the split terminal is linked to the setting up of a link between the base terminal T and the communicating equipments $E_n$. The communicating equipments $E_n$, physically independent of the base terminal, are linked with the base terminal T via proximity networks $PN_n$. The communication tunnels are set up between the base terminal T and the various communicating equipments $E_n$, as far as the final equipment terminating said split terminal, so as to allow a permanent and secured communication within the split terminal comprising the various equipments.

DETAILED DESCRIPTION OF THE DRAWINGS

A system and a method for creating a split terminal between a base terminal T and two equipments $E_1$ and $E_2$, connected in series to the base terminal T, will now be described in light of FIG. 1.

The situation is that in which a proximity service S requires the creation of a split terminal symbolically represented by the expression $T+E_1+E_2$. The management devices $PA_n$ for executing the split terminal procedure are represented with n=0, 1, 2, the index 0 representing the base terminal T.

Creation of the Split Terminal

Figure 1:
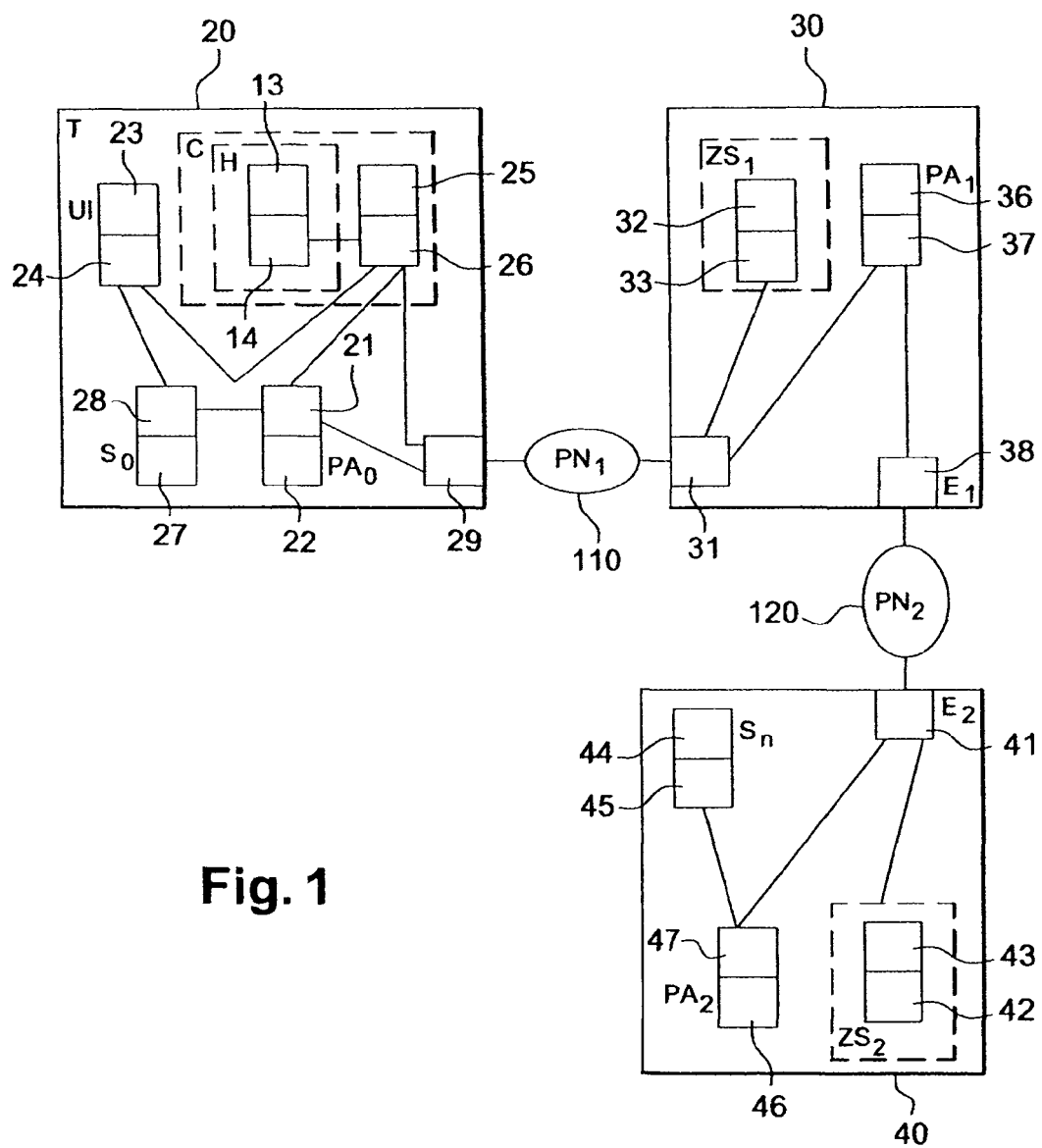
FIG. 1 represents the architecture of a system showing a split terminal made up of a base terminal and two equipments connected in series.

The system, according to the invention and corresponding to a split terminal, comprises in FIG. 1 a base terminal and two equipments connected in series. As a general rule, the proximity service S requires the creation of a split terminal $T+\Sigma E_n$ (where $E_n$ denotes the equipments to be connected in series to the terminal T). In FIG. 1, the number is limited to 2, as an example.

The composition of the split terminal is linked to the setting up of a link between the base terminal 20 and the communicating equipments E.sub.n 30, 40. Said communicating equipments 30, 40 are linked with the terminal T via proximity networks 110, 120. The invention allows for the setting up of a secured communication for the exchange of data between a base terminal T and a number of communicating equipments E.sub.n.

Said proximity networks 110, 120 support communications belonging to the group made up of proximity wired, radio, optical and radiocommunication communications, such as a cable serial link, a mobile telecommunications GPRS network, a Wifi (Wireless Fidelity) network, an IrDA (Infrared Data Association) infrared link, a contactless proximity or NFC (Near Field Contactless) communication link or even a Bluetooth wireless radio link (short distance radio link), etc.

The base terminal T 20 can be of any kind, for example a personal computer or PC, a mobile terminal or even any other terminal allowing the addition of communicating equipments $E_n$ 30, 40. The communicating equipments $E_n$ 30, 40 can be of different types, for example a public communication terminal with an email service, a communicating drinks dispenser with an electronic payment application, a communicating parking pay terminal, a communicating parking meter, a PC type personal computer, etc. Consequently, the equipments $E_n$, with which the user of the terminal wishes to communicate, may not belong to him and therefore may not be freely available to the user.

The composition of the split terminal is created irrespective of the nature of said communication equipments, without having to create a configuration to make the terminal and said equipments compatible, which avoids any waste of time and errors in configuring said terminal by the user. The compatibility and security of the communication set up between the terminal and the communicating equipments are assured automatically, by being adapted to any communicating equipment, whether near or remote.

The system according to the invention allows for the creation of a split terminal $T+\Sigma E_n$ for accessing a service S, said system comprising a base terminal T, equipped with a management device $PA_0$ for executing a split terminal procedure UES, and a plurality of equipments $E_n$ connected in series to said base terminal T, said equipments $E_n$ being each respectively equipped with at least one management device $PA_n$ for executing said split terminal procedure UES.

On the base terminal T 20, UI represents the user interface 23 which can be a display screen or any other means allowing access from or to the user, such as a voice control, for example.

The user interface (UI) 23 controls at least one device 27 of the proximity service $S_0$ on the terminal 20 via first and second corresponding communication interfaces 24 and 28.

Said device 27 of the proximity service $S_0$ on the terminal 20 is responsible for implementing the proximity service S. It allows for the creation of the split terminal and manages the exchanges with at least one device 44 of the proximity service $S_2$ on a communicating equipment $E_2$ 40 that terminates said split terminal.

To create the split terminal, the device 27 of the service $S_0$ transmits a "split terminal creation" request message, via a third communication interface 28 and a fourth communication interface 21, to the management device $PA_0$ 22 of the multi-equipment split terminal. Said request message contains the parameters of the communicating equipments that make up said split terminal to be produced, and the order of succession for the connection of the series of equipments that make up the split terminal. As an example, said service $S_0$ device 27 for accessing the proximity service S can be represented in the form of a hyperlink on the user interface UI 23 (such as a screen, for example), which controls the transmitted request.

The base terminal 20 therefore comprises at least said first security device 25 receiving the identity of at least one communicating equipment E 30, 40, at least one user interface 23 accessing the resources of said terminal 20, said management device $PA_0$ 22 for managing said split terminal. It also comprises means of sending and receiving data, such as communication interfaces 13, 21, 24, 26, 28 for data communication from the terminal 20 and at least one access interface 29 for accessing at least one communicating equipment E 30, 40, via at least one proximity network PN.

Said management device $PA_0$ 22 of the multi-equipment split terminal is responsible for producing the split terminal according to the content of the request from the service $S_0$ device 27 and maintaining it until execution of the proximity service S is finished.

Said management device $PA_0$ 22 controls the creation of the multi-equipment split terminal by successive iterations of the UES procedure for the equipments mentioned in said request and in the exact order specified by this request. Said UES (User Equipment Split) procedure is identical to that described in European patent application No. 03293342.6, but it is modified to allow a successive iteration for creating the multi-equipment split terminal.

The management device $PA_0$ 22 of the multi-equipment split terminal executes the iterations for the connection of each equipment to the split terminal. This step is iterative and each time indicates the number of the equipment to be connected. Each iteration is specific to the equipment to be connected with different parameters and devices, data contained in said "split terminal creation" request message. The management device $PA_0$ 22 repeats the procedure as many times as there are equipments $E_n$ to be connected to the split terminal in accordance with the request from the proximity service. On completion, a split terminal $T+\Sigma E_n$ is created, where $\Sigma E_n$ is equivalent to $E_1+E_2+\ldots+E_n$.

To do this, the management device $PA_0$ 22 transmits a "trigger" message to a security device 25 of the terminal 20, via communication interfaces 21 and 26, to connect the first equipment $E_1$ 30. The management device $PA_0$ 22 is the only one to know the equipment to be connected and transmits the messages between said equipment $E_1$ and the security device 25 of the terminal 20.

The security device 25 of the terminal 20 requests the identification of the first communicating equipment $E_1$ 30. Said security device 25 sends an identification query message to at least one security device 32 from said first communicating equipment $E_1$ 30 via a communication interface 33, through the intermediary of the management device $PA_0$ 22 via the communication interfaces 26 and 21, and of the access interfaces 29 and 31 on both sides of the proximity network $PN_1$ 110. Said message contains the reference of the current procedure for activating the split terminal and the "identification request" message type.

A communicating equipment E 30, 40 therefore comprises at least one second security device 32, 42 for handling its identification, its authentication and an integrity check on said equipment E, said management device $PA_n$ 36, 46 for managing said split terminal. It also comprises means of sending and receiving data, such as communication interfaces 33, 37, 43, 45, 47 for data communication from said equipment 30, 40 and at least one access interface 31, 38, 41 for the exchanges from said split terminal, through the intermediary of at least one proximity network PN.

After the UES procedure leading to the construction of the terminal $T+E_1$, the management device $PA_0$ 22 transmits a "tunnel creation" message to create a permanent communication tunnel T0-1 to the management device 36 of the equipment $E_1$. The tunnel is created between the management devices $PA_0$ and $PA_1$ 22, 36 of the split terminal.

The procedure is repeated for the various equipments to be connected by going through the management device $PA_0$ 22 of the terminal 20.

The management device $PA_0$ 22 of the terminal 20 transmits a "parameter exchange" message to the management device $PA_1$ 36 of the equipment $E_1$ containing the parameters needed to access the second communicating equipment $E_2$ 40. These parameters comprise, in addition:—the identifier of a second interface 38 for access to the first communicating equipment $E_1$ 30 for accessing the second communicating equipment $E_2$ 40;—an address of said second communicating equipment $E_2$ 40 for the proximity network $PN_2$ between the first and the second equipments $E_1$, $E_2$;—an identifier of the management device $PA_2$ 46 of the equipment $E_2$.

Similarly, said "parameter exchange" message is iterative for each of the equipments that make up the split terminal.

When the terminal $T+E_1$ has been constructed, the management device $PA_0$ 22 begins a new UES procedure with the second communicating equipment $E_2$ 40, identical to that of the first equipment $E_1$.

The management device $PA_0$ 22 transmits a "trigger" message to the security device 25 of the terminal 20, through the intermediary of the communication interfaces 21 and 26. Said security device 25 of the terminal 20 requests the identification of the second communicating equipment $E_2$ 40.

Said security device 25 sends an identification query message to a security device 42 of the second communicating equipment $E_2$ 40, via the interfaces 26 and 21, via the management device $PA_0$ 22, via the communication tunnel T0-1, via the management device $PA_1$ 36 of the equipment $E_1$ and a communication interface 37, via the interface 38 for access to said first equipment $E_1$, via the proximity network $PN_2$ 120, via an access interface 41 and a communication interface 43 of the second communicating equipment $E_2$ 40. Said message contains the reference of the current procedure for activating the split terminal and the "identification request" message type.

To construct the terminal $T+E_1+E_2$, the management device $PA_1$ 36 transmits a "tunnel creation" message for the creation of a permanent communication tunnel T1-2 to the management device $PA_2$ 46 of the equipment $E_2$, the identifier of which is contained in the parameters transmitted. Furthermore, the management device $PA_0$ 22 transmits a "tunnel creation" message for the creation of a permanent communication tunnel T0-2 to the management device $PA_2$ 46 of the equipment $E_2$. Said message is encapsulated in the tunnel T0-1 to the management device $PA_1$ 36 which transmits it in the tunnel T1-2. The tunnel is created between the management devices $PA_0$ and $PA_2$ 22, 46 of the multi-equipment split terminal.

In the case of more than two equipments, the management device $PA_0$ 22 of the terminal 20 transmits a "parameter exchange" message to the management device $PA_2$ 46 of the communicating equipment $E_2$, via a communication interface 47, containing the parameters needed to access a third communicating equipment, and so on with the subsequent equipments. The management device $PA_0$ 22 of the terminal 20 repeats the procedure as many times as there are equipments $E_n$ to be connected for the split terminal in accordance with the request from the proximity service S. On completion, a split terminal $T+\Sigma E_n$ is created.

When the multi-equipment split terminal $T+\Sigma E_n$ is created, the management device $PA_0$ 22 of the terminal 20 is ready to transmit the communications sent by the service $S_0$ device 27 to the terminating equipment $E_n$ of said split terminal. In the equipment $E_n$, a service $S_n$ device is provided to communicate with the service $S_0$ device 27 of the terminal 20, in order to produce the proximity service S. The service $S_0$ device 27 knows the address of the service $S_n$ device 44 transmitted in the parameters of the communicating equipment $E_n$. The communications between the service $S_0$ and $S_n$ devices 27 and 44 pass through the tunnel T0–n connecting the management devices $PA_0$ and $PA_n$ 22 and 46. Said communications from the service $S_0$ device 27 go through the management device $PA_0$ 22 to access the service $S_n$ device 44, and that from the service $S_n$ device 44 goes through the management device $PA_n$ 46 to access the service $S_0$ device 27. Then, the proximity service S can be executed.

When the proximity service is ended, the service $S_0$ device 27 of the terminal 20 sends an "end of service" message to the management device $PA_0$ 22.

The management device $PA_0$ 22 of the terminal 20 sends an "end of split terminal" message to the management device $PA_1$ 36 of the equipment $E_1$ via the tunnel T0-1, which transmits it to the management device $PA_2$ 46 via the tunnel T1-2 and so on to the management device $PA_n$. The management devices $PA_n$, close the tunnels associated with the multi-equipment split terminal and delete the data associated with said split terminal corresponding to the reference of the procedure.

Similarly, the management device $PA_0$ 22 of the terminal 20 can decide to close the multi-equipment split terminal after a period of absence of communications between the service $S_0$ and $S_n$ devices. The management device $PA_0$ 22 of the terminal 20 then transmits said message to the management device $PA_1$ 36 of the equipment $E_1$, and so on.

After the closure, there remains no trace of said multi-equipment split terminal on the equipments $E_n$ of which it was made up.

Figure 2:
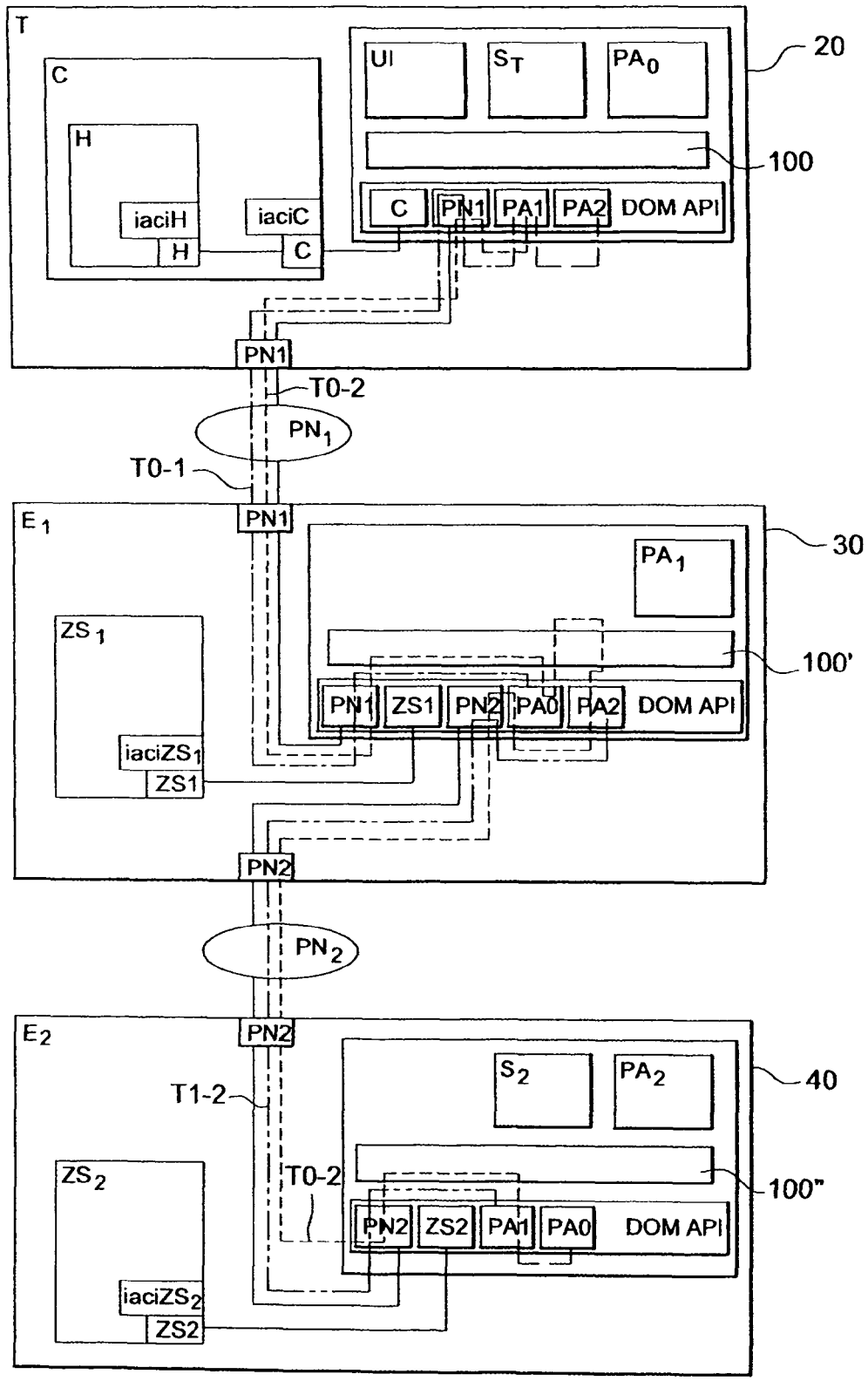
FIG. 2 is a diagram showing a particular embodiment of a split terminal according to the invention.

According to a particular embodiment, represented in FIG. 2, the management devices $PA_n$ for executing the split terminal procedure can be produced as interactive Web content, also called "Web application". The Web applications run using a type of Web browser (referenced 100, 100', 100" in FIGS. 2 and 3), called "NG (new generation) browser". This type of browser has client and server functions, and defines universal application interfaces called DOM API, application interfaces (API) written in W3C DOM (Document Object Model) language. Each DOM API defines an access interface to a physical or logical interface. For example, if the terminal T has an infrared network interface (Irda), the browser of the terminal T will have an "Irda" DOM API enabling a Web application to access the Irda network interface in a standard manner. The "Irda" DOM API masks for the Web application the implementation differences of an Irda network interface on a user equipment.

The management devices $PA_n$ are used to carry out the UES procedure and offer the service S an access interface to the equipments $E_n$. As seen from the service S, the management devices $PA_n$ act as DOM API for access to an equipment regardless of the underlying technology.

To operate according to this model, the terminal T and the equipments $E_1$ and $E_2$ all have an NG browser and DOM APIs allowing access to their respective interfaces.

The following example of use amounts to Web browsing. In this case, the user interface UI of the base terminal T is represented by a Web application, which is used to run the service S. The user accesses said user interface UI on his terminal T, browses, selects and activates a link for access to the service S, for example, the "object" navigation element of the XHTML-Basic language. The service S device is a Web application ($S_0$ on the terminal T) which executes the service procedure.

The service S comprises the Web application ST on the terminal T containing the access parameters and the procedures for carrying out said service. With n in this case being 0, 1 or 2, the parameters are [(id(T) , , , $PA_0$), (id($E_1$), @($E_1$), CA($E_1$), $PA_1$), (id($E_2$), @($E_2$), CA($E_2$), $PA_2$)], where $PA_0$, $PA_1$, $PA_2$ are specified in the URI (Universal Resource Identifier) Web format.

For each equipment $E_n$, the corresponding access parameters (id($E_n$), @($E_n$), CA($E_n$), $PA_n$) are indicated:

id($E_n$) is an identifier of the equipment $E_n$,

@($E_n$) is an address identifying the equipment $E_n$ in the proximity network $PN_n$ connecting the equipments $E_{n-1}$ and $E_n$. In the case of networks that have no address, such as the infrared network, this address is not specified, CA($E_n$) is the access path to the equipment $E_n$, specifying the interface of the proximity network of the equipment $E_{n-1}$ providing access to the equipment $E_n$.

The parameters include access to the application $PA_0$. The application ST executes the management device $PA_0$ by transmitting as execution parameters of the parameters for access to the equipments $E_n$. The transfer of the parameters from ST to $PA_0$ is handled, for example, using an application interface using the simple object access protocol (SOAP) or any other web description language for exchanging information between application interfaces. The management device $PA_0$ is a Web application provided to produce the split terminal T+E1+E2 according to the instructions included in the access parameters associated with the service S.

Step 1

The management device $PA_0$ launches the UES procedure to create the split terminal T+$E_1$, by connecting the equipment $E_1$ to the terminal T. The DOM API for access to $E_1$ is the "Irda" DOM API ($PN_1$=Irda network in FIG. 2). From the parameters for access to $E_1$, $PA_0$ deduces the DOM API for access to the network $PN_1$ ("Irda" DOM API), generates a communication to $E_1$ (an infrared link requires no address). $PA_1$ is a Web application on $E_1$. It listens to the interface for access to the network $PN_1$. The opening of a communication from $PA_0$ to $E_1$ activates the access interface to the network $PN_1$ of $E_1$, generates the data reception event on the "Irda" DOM API of $E_1$, which activates $PA_1$. The management device $PA_1$ intercepts all communications originating from the access interface to the network $PN_1$, analyses them before retransmitting them to the recipient application. $PA_1$ acts as a relay for $PA_0$ in $E_1$ for carrying out the UES procedure. The exchanges during the UES procedure between $PA_0$ and $PA_1$ are handled, for example, by the SOAP protocol. The UES procedure runs in accordance with the European patent application No. 03293342.6. After this procedure, the split terminal T+$E_1$ is created.

Step 2

After the creation of the split terminal T+$E_1$, $PA_0$ transmits to $PA_1$ the parameters for access to $E_2$. The management device $PA_0$ sets up a permanent communication tunnel T0-1 to $PA_1$, for example, via the HTTP protocol. This communication can be secured by encryption keys derived from the preceding UES procedure; in this case, it is the HTTPS protocol that applies (HTTP protocol encapsulated in a security protocol like SSL or TLS). A temporary "$PA_1$" DOM API is created by $PA_0$ on the terminal T pointing to the tunnel T0-1 so as, by invoking this "$PA_1$" DOM API, to give access to the management device $PA_1$ via the tunnel T0-1. Similarly, a temporary "$PA_0$" DOM API is created by $PA_1$ on $E_1$ pointing to the tunnel T0-1 so as, by invoking this "$PA_0$" DOM API, to give access to the management device $PA_0$ via the tunnel T0-1.

Step 3

Step 3 is identical to step 1: $PA_0$ launches the UES procedure to create the split terminal (T+$E_1$)+$E_2$ by connecting $E_2$ to the split terminal T+$E_1$. The only difference compared to step 1 is that the preceding "Irda" DOM API ($PN_1$=Irda network) for access to $E_1$ is replaced by the DOM API for access to $E_2$ which is none other than the "$PA_1$" DOM API. The parameters for access to $E_2$ are transmitted from $PA_0$ to $PA_1$ via the "$PA_1$" DOM API, for example, by the SOAP protocol. $PA_1$ deduces from the parameters the method of accessing $E_2$ ("Wifi" DOM API, $PN_2$=Wifi network in FIG. 2) and generates a communication to $E_2$ using the address of $E_2$ in the network $PN_2$. $PA_2$ is a Web application on $E_2$. It listens to the access interface to the network $PN_2$. The opening of a communication from $PA_1$ to $E_2$ activates the access interface to the network $PN_2$ on $E_2$ and generates the data reception event on the "$PN_2$" DOM API of $E_2$, which activates $PA_2$. The management device $PA_2$ intercepts all communications originating from the interface with the network $PN_2$, analyses them before retransmitting them to the recipient application. $PA_2$ acts as a relay for $PA_0$ in $E_2$ to carry out the UES procedure. $PA_1$ is responsible for retransmitting in $E_1$ the exchanges between $PA_0$ and $PA_2$. The exchanges during the UES procedure between $PA_0$ and $PA_2$ are carried out, for example, by SOAP. The UES procedure runs in accordance with the European patent application No. 03293342.6. After this procedure, the split terminal T+$E_1$+$E_2$ is created.

Step 4

Step 4 is identical to step 2. After the creation of the split terminal T+$E_1$+$E_2$, $PA_0$ transmits no parameter to $PA_2$, E2 being the final equipment of the split terminal. $PA_1$ sets up a permanent communication tunnel T1-2 with $PA_2$, for example, via the HTTP protocol. A temporary "$PA_2$" DOM API on $E_1$ is created by $PA_1$, pointing to the tunnel T1-2 so as, by invoking this "$PA_2$" DOM API, to give access to the application $PA_2$. Similarly, a temporary "$PA_1$" DOM API on $E_2$ is created by $PA_2$ pointing to the tunnel T1-2 so as, by invoking this "$PA_1$" DOM API, to give access to $PA_1$. The management device $PA_0$ sets up a permanent communication tunnel T0-2 with $PA_2$, for example, via the HTTP protocol. This communication can be secured by encryption keys derived from the preceding UES procedure; in this case, it is the HTTPS protocol that applies (HTTP protocol encapsulated in a security protocol like SSL or TLS). A temporary "$PA_2$" DOM API on T is created by the management device $PA_0$ pointing to the tunnel T0-2 so as, by invoking this "$PA_2$" DOM API to give access to $PA_2$. Similarly, a temporary "$PA_0$" DOM API on $E_2$ is created by $PA_2$ pointing to the tunnel T0-2 so as, by invoking this "$PA_0$" DOM API to give access to $PA_0$. It will be noted that the tunnel T0-2 is encapsulated in the tunnels T0-1 and T1-2. The tunnels T0-1 and T1-2 are joined by $PA_1$.

Step 5

The management device $PA_0$ informs the application ST that the split terminal has been produced in accordance with its instructions.

Service S Procedure

The service S is broken down into a part on T (ST application) and a part on E2 (S2 application), these two applications being web applications intercommunicating via the Web applications $PA_0$ and $PA_2$ which are seen as DOM API respectively for the applications S2 and ST. The application interface (API) for access from ST to S2 is $PA_0$ and the application interface for access from $S_2$ to ST is $PA_2$. ST, in its capacity as a Web application, is capable of navigating within applications of $E_2$, made accessible from the browser of this equipment, offering the Web server function. As on the Internet, the browser of $E_2$ offering a Web server function, publishes the application $S_2$. ST accesses $S_2$ via the browser of $E_2$ and the "$PA_0$" DOM API. ST accesses S2 because $S_2$ is specified in the ST application in the form, for example, of an "object" navigation element of the XHTML-Basic language. The application $S_2$ can be a simple Web page. The application ST downloads this Web page and has it displayed by the browser of the terminal T.

As an example of actual use, the terminal T is the mobile terminal of a user, the equipment $E_1$ is a television gateway in the form of a box in the lounge of the customer and the equipment $E_2$ is the pay server for films in the network of an operator. The terminal T accesses the equipment $E_1$ via a Wifi network. The equipment $E_1$ accesses the equipment $E_2$ via an IP network.

Following the selection of the service S by the user, the split terminal comprising mobile terminal+gateway+pay server is created. The application ST accesses the list published by the application $S_2$ in the form of a Web page of films that can be bought by the customer. The customer makes his choice. The code for right of access to the selected film is transmitted from the application $S_2$ to the application ST and stored on the terminal T. The application ST controls the closure of the split terminal.

The films are broadcast to the terminal T via the television gateway, the application ST runs the film playback application on the terminal T by supplying as a parameter the access right code for the latter to decode the film broadcast via the gateway and restore it to the customer. When the proximity service S is a payment service, said service executes the applications ST and $S_n$ according to a certified method and in accordance with the payment procedure. To guarantee the certification, ST and $S_n$ can, for example, be included in a chip card or a secured electronic component.

Figure 3:
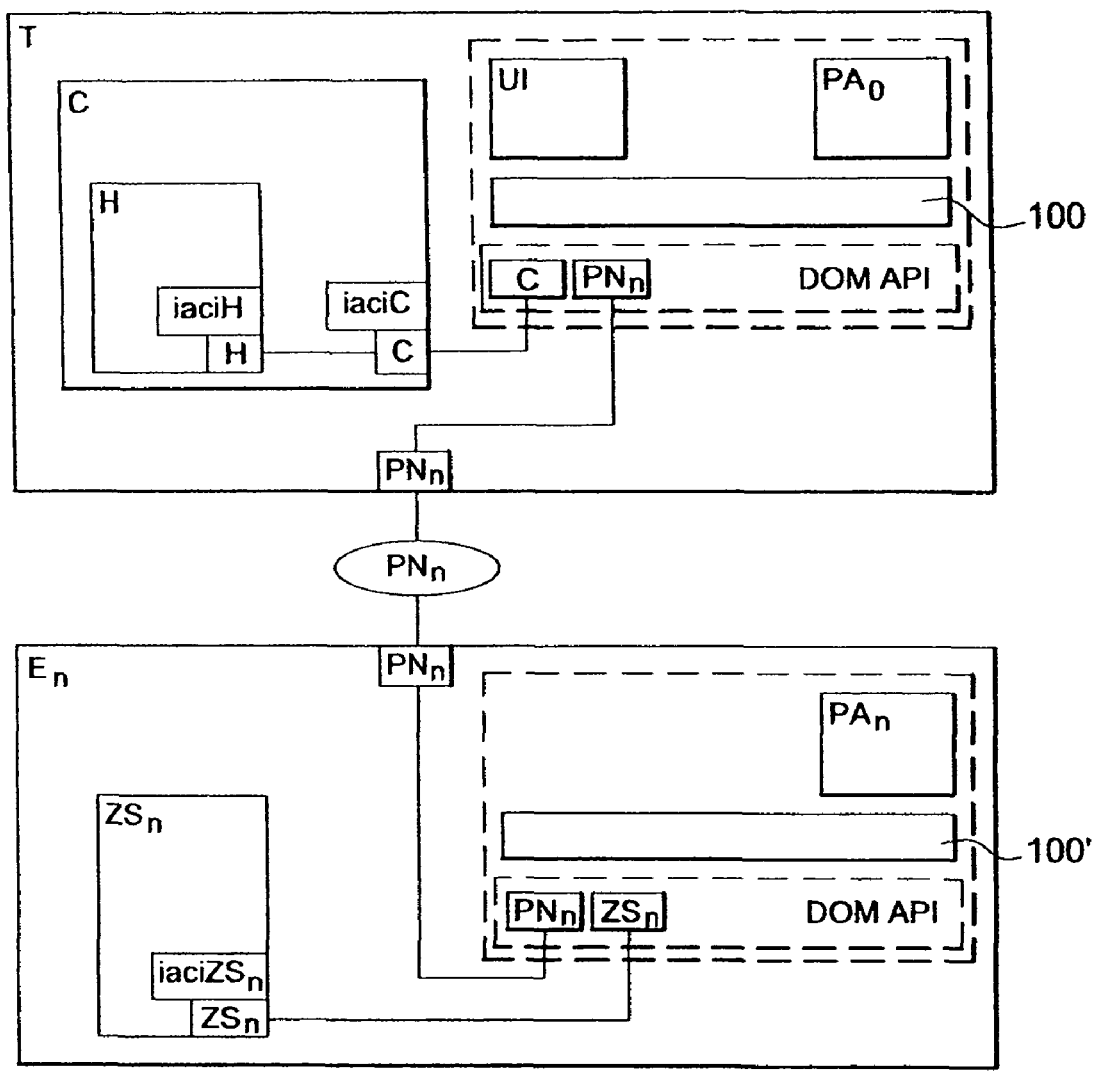
FIG. 3 is a diagram illustrating the split terminal procedure between a base terminal and an equipment.

The UES procedure will now be described in detail with reference to FIG. 3.

The UES procedure is derived from the European patent application No. 03293342.6 and adapted to manage the activation of a split terminal connecting a number of equipments T+$\Sigma E_n$.

Compared to the description of this document, the model taken as an example is a simplified model of the split terminal, in which the authentication server and its ratification device are incorporated in a security device C.

The application $PA_0$ has previously been activated by the activation of the service S via the user interface UI. The application $PA_0$ sends to the security device C via the "C" DOM API an "equipment identification" type message.

The "equipment identification" message is transmitted to the application iaciC, which generates a reference enabling an activation request to be identified out of a set of activation requests. It sends an identification query message, via the interface C, from the "C" DOM API to the application $PA_0$. The application $PA_0$ relays the message to the application iaciZS$_n$ of the security area $ZS_n$ of the equipment $E_n$ and containing the reference of the current procedure and the "identification request" message type. The DOM API intended for the equipment $E_n$ is identified by the parameters for access to the equipment $E_n$ included in the application $PA_0$.

An application $PA_n$ is a Web application listening for activity on the access interface to the network $PN_n$ of the equipment $E_n$. The receipt of the "identification request" message leads the application $PA_n$ to relay it to the application iaciZS$_n$ via the "$ZS_n$" DOM API and the interface $ZS_n$. The application iaciZS$_n$ transmits, relayed via the applications $PA_n$ and $PA_0$, to the application iaciC, an identity query response message containing the reference of the current procedure, the "identity query response" message type and the encrypted identity IC produced from encryption by KA of the identity IE of the equipment $E_n$ and the reference of the current procedure. It will be noted that the key KA is used to encrypt the identity IE of the equipment $E_n$ so that it can be decrypted only by the ratification device H in order to avoid any fraudulent manipulation of the terminal T. The reference of the current procedure is employed for the purpose of adding a random value to the encryption product, so that the product IC is always different and is not reproducible by simple copying. The key KA(IE) always gives the same result, whereas KA(IE, procedure reference) gives results that are always different, since the reference of the procedure varies on each activation.

After having received the "identity query response" message, the application iaciC transmits a message to the application iaciH containing the reference of the current procedure, the "identity consultation" message type, the identity IC of the equipment $E_n$ encrypted by the key KD(KD(IC)) and the abstract COCI produced by the encryption from the key KD of the preceding components of this message. The abstract is used for the validation of the message and the authentication of the sending device by the recipient device. It will be noted that the abstract is always encrypted by a key so that the recipient equipment can decrypt it by the complementary key and so authenticate the device sending the message. In the present case, the sending device (the application iaciC of the security card C) encrypts the abstract with the key KD and the receiving device (application iaciH of the ratification device H) decrypts the abstract by the complementary key KD'. The application iaciC of the security card C encrypts the product IC by its key KD in order that the device iaciH is assured that the application iaciC has validated the starting of the activation procedure by decrypting the product KD(IC).

After having received the "identity consultation" message, the application iaciH decrypts the abstract COCI and the product KD(IC) by its key KD' and deduces from it the validity of the message and the product IC. Knowing the reference of the current procedure and having the key KA', it decrypts the product IC and deduces from it the identifier IE of the equipment $E_n$. By using a mapping table containing the identities IE, the keys KC and the titles of the equipments $E_n$—the titles are common names of the equipments $E_n$, for example "pay terminal"—and knowing the identity IE of the equipment $E_n$, the application iaciH deduces the key KC of the equipment $E_n$ and deduces from it the title of the equipment $E_n$. If the decryption proceeds correctly and the identity IE of the equipment $E_n$ and the reference of the current procedure then decrypted are in accordance with the information expected by the application iaciH, then the application iaciH considers the equipment $E_n$ to be identified. From another mapping table, the device iaciH deduces from the identity IE of the equipment $E_n$ a set of pairs (sealing key CSH, integrity checking software AVI), and a pair is selected at random from the set of pairs available. The application iaciH randomly chooses from a mapping table a pair of encryption keys (KTA, KTA') out of a set of available pairs. The application iaciH encrypts the key KTA by the key KB(KB(KTA)), the key KTA' encrypted by the key KC, the whole encrypted by the key KB(KB(KC(KTA'))) and the AVI software encrypted by the key KC(KC(AVI)). The application iaciH transmits to the application iaciC a message containing the reference of the current procedure, the "identity consultation positive response" message type, a plain language title of the equipment $E_n$, the product KB(KTA), the product KB(KC(KTA')), the product KC(AVI) and the abstract CORP produced from the encryption by the key KB of the preceding components of this message. If any one of the operations preceding this step has failed, then the device transmits, in place of the preceding message, a message containing the reference of the current procedure and the "identity consultation negative response" message type and the abstract CORP produced from the encryption by the key KB of the preceding components of this message. It will be noted that the identification and authentication of the application iaciZS$_n$ is done on decrypting IC and searching for its identity in the mapping table. The integrity check works on the principle that the ratification device H alone knows the result of the execution of an AVI software program on the equipment $E_n$. The expected result is a sealing key CSH and the result produced by the AVI software will be another sealing key CSZS which, if the equipment $E_n$ checks out, should be identical to CSH. To avoid predicting the result of CSZS, the device H randomly selects an AVI software program out of several available and, in this way, the result cannot be predicted by the equipment $E_n$. The device H allocates a pair of temporary keys (KTA', KTA) in order to allow the exchange between the security device C and the area ZS of temporary encryption keys necessary for the security of the exchanges between the terminal T and the equipment $E_n$ when the split terminal is operating. The key KTA is encrypted by the key KB because the key KTA will be used by the application iaciC. The key KTA' is encrypted by the key KC, then by the key KB, and in this way the key KTA' will be transmitted to the application iaciZS only if the application iaciC has previously given its agreement by decrypting the product KB(KC(KTA')). The AVI software is encrypted by the key KC so that only the application iaciZS can decrypt the AVI software and so prevent any fraudulent use of the iaciC application on the code of the AVI software.

If the message is of the "identity consultation positive response" type, the application iaciC decrypts from its key KD and deduces from it the validity of the message by decrypting CORP, and, from its key KB', deduces from it the key KTA and the product KC(KTA'). The iaciC device sends, via the interface C and the "C" DOM API, to the user interface UI, a message containing the reference of the current procedure, the "identification accepted" message type and a plain language title of the equipment $E_n$. If the message is of the "identity consultation negative response" type, the application iaciC decrypts from its key KD and deduces from it the validity of the message by decrypting CORP. If the message is of the "identity consultation negative response" type or if any one of the operations preceding this step has failed, then the application iaciC stops the activation procedure and sends, via the interface C and the "C" DOM API, the user interface UI a message containing the reference of the current procedure and the "identification error" message type. The exchange between the interface C and the "C" DOM API is handled, for example, by the SIMAccess solution.

After having received the "identification error" message, the user interface UI can then display a message to indicate to the user the reason why the activation procedure failed.

After having received the "identification accepted" message, the user interface UI can then display a message indicating the title of the equipment $E_n$ and a question on how to continue the activation procedure. The message can be formatted, for example, in the form of a web page if the user interface UI is a web browser. The user chooses whether to continue the procedure by selecting the response from the choices offered. If the response is positive, the user interface UI transmits to the iaciC application a message containing the reference of the procedure and the "procedure acceptance" message type. If the response is negative, the user interface UI transmits to the application iaciC a message containing the reference of the procedure and the "procedure rejection" message type.

If the message is of the "procedure acceptance" type, the application iaciC chooses a pair of keys (KTB, KTB') from the set of pairs available and contained in a mapping table, encrypts the key KTB from the key KTA (KTA(KTB)) and transmits to the application iaciZS$_n$ of the security area ZS$_n$ a message containing the reference of the procedure, the "authentication request" message type, the product KC(KTA'), the product KTA(KTB), the product KC(AVI) and the abstract CODA produced from the encryption by the key KTA of the preceding components of this message. If the message is of the "procedure rejection" type, or if any one of the operations preceding this step has failed, the application iaciC stops the activation procedure and sends to the user interface UI a message containing the reference of the procedure and the "stop procedure" message type. It will be noted that the application iaciC allocates a pair of temporary keys (KTB', KTB) to allow for the encryption of the exchanges in the direction from the application iaciZS$_n$ to the application iaciC. The application iaciC encrypts the key KTB by the key KTA to ensure that only the application iaciZS$_n$, knowing KTA', is capable of decrypting the product KTA(KTB) and so extracting the key KTB.

After having received the "stop procedure" message, the user interface UI can then display a message to indicate to the user the reason why the activation procedure has failed.

After having received the "authentication request" message, the application iaciZS$_n$ decrypts from its key KC' and deduces from it the AVI software and the encryption key KTA', and from the key KTA', deduces from it the key KTB and the validity of the message by decrypting the abstract CODA. The application iaciZS$_n$ executes the AVI software. The AVI software is designed to be able to be executed only on an equipment E$_n$ of the type previously identified by the ratification device H (the AVI software is said to be "signed") and is designed to produce a value called "CSZS$_n$ sealing key", also called hash or hashing key, from a set of data collected while the AVI software was being executed in the equipment E$_n$. The information collected can be, for example, a file name, the date and time of the internal clock of the equipment E$_n$, the memory space used, and so on. When execution of the AVI software is finished, the application iaciZS$_n$ chooses a pair of keys (KTC, KTC') at random from the set of pairs available contained in a mapping table. The application iaciZS$_n$ encrypts the sealing key CSZS$_n$ encrypted by the key KA, the set encrypted by the key KTB (KTB(KA(CSZS$_n$))) and encrypts the key KTC from the key KTB (KTB(KTC)). It sends to the application iaciC a message containing the reference of the procedure, the "authentication response" message type, the product KTB(KA(CSZS$_n$)), the product KTB(KTC) and the abstract CORA produced from the encryption by the key KTB of the preceding components of this message. If any one of the operations preceding this step has failed, then the application iaciZS$_n$ sends to the application iaciC a message containing the reference of the procedure, the "authentication anomaly" message type and the abstract CORA produced from the encryption by the key KTB of the preceding components of this message. It will be noted that the device iaciZS$_n$ allocates a pair of temporary keys (KTC', KTC) to allow for the encryption of the exchanges in the direction from application iaciC to application iaciZS$_n$. The application iaciZS$_n$ encrypts the key KTC by the key KTB in order to securely transfer the key KTC to the application iaciC. The sealing key CSZS$_n$ is encrypted by the key KA then by the key KTB, the key KTB guaranteeing that the application iaciC will have validated the product KTB(KA(CSZS$_n$)) by decrypting it and the key KA guaranteeing that the key CSZS$_n$ is sent by the device iaciZS$_n$ and will be decryptable only by the application iaciH, with no possibility of fraudulent use on the part of the iaciC application.

If the message is of the "authentication response" type, the application iacic decrypts from its key KTB' and deduces from it the product KA(CSZS$_n$), the key KTC and the validity of the message by decrypting the abstract CORA. The application iaciC encrypts the product KA(CSZS$_n$) encrypted by the key KD (KD(KA(CSZS$_n$))). It transmits to the application iaciH a message containing the reference of the procedure, the "authentication validation" message type, the product KD(KA(CSZS$_n$)) and the abstract CORC produced by the encryption by KD of the preceding components of this message. If the message is of the "authentication anomaly" type, the application iaciC decrypts from its key KTB' and deduces from it the validity of the message by decrypting the abstract CORA. If the message is of the "authentication anomaly" type, or if any one of the operations preceding this step has failed, then the application iaciC stops the activation procedure and sends to the user interface UI a message containing the reference of the procedure and the "authentication error" message type. It will be noted that the application iaciC encrypts the product KA(CSZS$_n$) by the key KD by way of validation of good transit by the application iaciC.

After having received the "authentication error" message, the user interface UI can then display a message to indicate to the user the reason why the procedure failed.

After having received the "authentication validation" message, the application iaciH decrypts from its key KD' and deduces from it the validity of the message by decrypting the abstract CORC and the product KA(CSZS$_n$), then decrypts from its key KA' and deduces from it the sealing key CSZS$_n$. The application iaciH compares the sealing key CSZS$_n$ with the sealing key CSH obtained previously by the mapping table (equipment identifier E$_n$, (sealing key CSH, AVI software )). If the two sealing keys CSH and CSZS$_n$ match, then the equipment E$_n$ is considered authenticated (because the equipment E$_n$ is certain to have the key KC') and to be checked out (because the two sealing keys correspond), and, otherwise, it is considered to be corrupted. The application iaciH sends to the application iaciC a message containing the reference of the procedure, the message type and an abstract COVC produced by the encryption by KB of the preceding components of this message. The message type is either "integrity check positive verification" or "integrity check negative verification" if any one of the operations preceding this step has failed.

After having received the message, the application iaciC decrypts from its key KB' and deduces from it the validity of the message by decrypting the abstract COVC. If the message is of the "integrity check positive verification" type, the application iaciC sends, via the interface "C" and the "C" DOM API, to the application PA$_0$, a request to activate the split terminal in the form of a message containing the reference of the procedure, the "split terminal activation" message type and the keys KTC and KTB'. If the message is of the "integrity check negative verification" type, or if any one of the operations preceding this step has failed, then the application iaciC stops the activation procedure and sends to the user interface UI a message containing the reference of the procedure, an "equipment corrupted" message type and the identity of the equipment E$_n$.

After having received the message "equipment corrupted", the interface UI can then display a message to indicate to the user the reason why the procedure failed.

After having received the "split terminal activation" message, the application PA$_0$ can communicate securely with the equipment E$_n$, the keys KTC and KTB' being employed to respectively secure the downlink and uplink communications between the application PA$_0$ and the security area ZS$_n$ (corresponding to the security device of the communicating equipment).

At this stage, the split terminal consisting of the terminal T and the equipment E$_n$ is operational, and the split terminal is considered activated.

The invention claimed is:

1. A method of creating a split terminal (T+ΣE$_n$) for accessing a service (S), said split terminal including a base terminal (T) and a plurality of equipments (E$_n$) connected in series to said base terminal (T), the base terminal (T) and said equipments (E$_n$) respectively having management devices (PA$_0$, PA$_n$) for executing a split terminal procedure, wherein said method comprises:

an initialization step including transmitting to the base terminal (T), by said service (S), the parameters for accessing said equipments (E$_n$), a plurality of successive iterative steps for creating a split terminal $(T+\Sigma E_{n-1})+E_n$ by connecting the equipment $E_n$ to the split terminal $T+\Sigma E_{n-1}$ created in the preceding step, each step comprising:

transmitting, by the base terminal (T) to the equipment $E_{n-1}$, the parameters for accessing the equipment $E_n$, setting up a communication between the management devices $PA_{n-1}$ and $PA_n$ for executing the split terminal procedure for the equipments $E_{n-1}$ and $E_n$, and creating the split terminal $(T+\Sigma E_{n-1})+E_n$ by executing the split terminal procedure between the management devices $PA_0$ and $PA_n$ via the management device $PA_{n-1}$.

2. The method according to claim 1, wherein said parameters for accessing the equipment $E_n$ comprise an identifier of the equipment $E_{n-1}$ of an interface $(CA(E_n))$ for accessing said equipment $E_n$ via a proximity network $(PN_n)$ linking the equipments $E_{n-1}$ and $E_n$.

3. The method according to claim 1, wherein said parameters for accessing the equipment $E_n$ comprise an address $(ad(E_n))$ of the equipment $E_n$ in a proximity network $(PN_n)$ and an identifier of the equipment $E_n$, and an interface on the equipment $E_{n-1}$ for accessing said equipment $E_n$ in the proximity network $(PN_n)$ linking the equipments $E_{n-1}$ and $E_n$ is determined by executing the split terminal procedure by the management device $PA_{n-1}$ successively on each interface of the equipment $E_{n-1}$ in said proximity network $(PN_n)$, until the split terminal procedure applied to one of said interfaces sends said identifier $(id(E_n))$ of the equipment $E_n$.

4. The method according to claim 1, wherein after the creation of the split terminal $(T+\Sigma E_{n-1})+E_n$, the management device $PA_{n-1}$ sets up a tunnel $T(n-1)-n$ for permanent communication with the management device $PA_n$, and wherein the management device $PA_0$ sets up a tunnel $T0-n$ for permanent communication with the management device $PA_n$, encapsulated in the tunnels $T0-(n-1)$ and $T(n-1)-n$.

5. A system for creating a split terminal $(T+\Sigma E_n)$ for accessing a service (S), said system comprising a base terminal (T), equipped with a management device $(PA_0)$ for executing a split terminal procedure, and a plurality of equipments $(E_n)$ connected in series to said base terminal (T), said equipments $(E_n)$ being each respectively equipped with at least one management device $(PA_n)$ for executing said split terminal procedure, wherein the system is configured to perform a method comprising:

an initialization step including transmitting to the base terminal (T), by said service (S), the parameters for accessing said equipments $(E_n)$, a plurality of successive iterative steps for creating a split terminal $(T+\Sigma E_{n-1})+E_n$ by connecting the equipment $E_n$ to the split terminal $T+\Sigma E_{n-1}$ created in the preceding step, each step comprising:

transmitting, by the base terminal (T) to the equipment $E_{n-1}$, the parameters for accessing the equipment $E_n$, setting up a communication between the management devices $PA_{n-1}$ and $PA_n$ for executing the split terminal procedure for the equipments $E_{n-1}$ and $E_n$, and creating the split terminal $(T+\Sigma E_{n-1})+E_n$ by executing the split terminal procedure between the management devices $PA_0$ and $PA_n$ via the management device $PA_{n-1}$.

6. A terminal for implementing the method according to claim 1 and suitable for implementation in a system for creating the split terminal $(T+\Sigma E_{n-1})+E_n$ for accessing the service (S), wherein the system comprises the base terminal (T), equipped with the management device $(PA_0)$ for executing the split terminal procedure, and the plurality of equipments $(E_n)$ connected in series to said base terminal (T), said equipments $(E_n)$ each respectively equipped with the management devices $(PA_0, PA_n$ for executing said split terminal procedure, and wherein the terminal comprises at least one first security device receiving the identity of at least one communicating equipment (E) of the plurality of equipments $(E_n)$, at least one user interface accessing the resources of said terminal, said management device $(PA_0)$ for managing said split terminal $(T+\Sigma E_{n-1})+E_n$ and at least means of sending and receiving data.

7. Communicating equipment (E) for implementing the method according to claim 1 and suitable for implementation in a system for creating the split terminal $(T+\Sigma E_{n-1})+E_n$ for accessing the service (S), wherein said system comprises the base terminal (T), equipped with the management device $(PA_0)$ for executing the split terminal procedure, and the plurality of equipments $(E_n)$ connected in series to said base terminal (T), said equipments $(E_n)$ being each respectively equipped with the management devices $(PA_0, PA_n)$ for executing said split terminal procedure, and wherein the communicating equipment (E) comprises at least one second security device for handling identification, authentication and integrity checking of said communicating equipment (E), said management device $(PA_n)$ for managing said split terminal $(T+\Sigma E_{n-1})+E_n$ and at least means of sending and receiving data.

8. The method according to claim 1, wherein the parameters for accessing said equipments $(E_n)$ are transmitted to the base terminal (T) in the form of a hyperlink accessed through a user interface of the base terminal (T).

9. The method according to claim 1, wherein the parameters for accessing said equipments $(E_n)$ are transmitted to the base terminal (T) in the form of a split terminal creation request comprising parameters of the equipments $(E_n)$ and an order of succession for connection of the equipments $(E_n)$.

* * * * *